United States Patent
Haveman et al.

(10) Patent No.: US 11,352,506 B2
(45) Date of Patent: Jun. 7, 2022

(54) UREA URETHANES

(71) Applicant: CLiQ SwissTech GmbH, Bergisch Gladbach (DE)

(72) Inventors: Daniel Haveman, Steenwijk (NL); René Stèphan Bouwman, Heerenveen (NL); René Marcel La Crois, Uithuizermeeden (NL)

(73) Assignee: CLiQ Swisstech B.V., Groningen (NL)

( * ) Notice: Subject to any disclaimer, the term of this patent is extended or adjusted under 35 U.S.C. 154(b) by 5 days.

(21) Appl. No.: 15/928,428

(22) Filed: Mar. 22, 2018

(65) Prior Publication Data

US 2018/0282553 A1    Oct. 4, 2018

(30) Foreign Application Priority Data

Apr. 1, 2017    (EP) .................................... 17164449

(51) Int. Cl.
| | | |
|---|---|---|
| *C09D 5/04* | (2006.01) | |
| *C09D 175/12* | (2006.01) | |
| *C08G 18/76* | (2006.01) | |
| *C08G 18/38* | (2006.01) | |
| *C08G 18/10* | (2006.01) | |
| *C08G 18/22* | (2006.01) | |
| *C09D 7/45* | (2018.01) | |
| *C08G 18/28* | (2006.01) | |
| *C08L 75/04* | (2006.01) | |
| *C09D 7/65* | (2018.01) | |

(52) U.S. Cl.
CPC ............... *C09D 5/04* (2013.01); *C08G 18/10* (2013.01); *C08G 18/225* (2013.01); *C08G 18/283* (2013.01); *C08G 18/3819* (2013.01); *C08G 18/7621* (2013.01); *C08L 75/04* (2013.01); *C09D 7/45* (2018.01); *C09D 7/65* (2018.01); *C09D 175/12* (2013.01)

(58) Field of Classification Search
CPC .. C08G 18/3819; C08G 18/10; C08G 18/225; C08G 18/7621; C08L 75/04; C09D 5/04; C09D 7/45; C09D 175/12; C09D 7/65
See application file for complete search history.

(56) References Cited

U.S. PATENT DOCUMENTS

| | | | |
|---|---|---|---|
| 4,314,924 A | | 2/1982 | Haubennestel et al. |
| 6,420,466 B1 | * | 7/2002 | Haubennestel ...... C08G 18/225 524/195 |
| 2019/0135969 A1 | * | 5/2019 | Haveman ................. C09D 7/65 |

FOREIGN PATENT DOCUMENTS

DE    2822908 B1    7/1979

OTHER PUBLICATIONS

Odian, George, "Principles of Polymerization", John Wiley & Sons, Inc., 1991, pp. 19-24.*

* cited by examiner

*Primary Examiner* — Patrick D Niland
(74) *Attorney, Agent, or Firm* — Dilworth & Barrese, LLP

(57) ABSTRACT

Suggested is a urea urethane with improved rheological properties, obtainable or obtained according to a process encompassing or consisting of the following steps:
(a) providing a monohydroxyl compound;
(b) providing a diisocyanate compound;
(c) reacting said monohydroxyl compound and said diisocyanate compound to form a pre-polymer;
(d) reacting said pre-polymer with a diamine compound in the presence of a lithium salt,
wherein said monohydroxyl compound and said diisocyanate compound are reacted in a molar ratio of 1:1.1 to 1:1.45.

16 Claims, 9 Drawing Sheets

UREA URETHANES

FIELD OF INVENTION

The present invention is related to coating additives and covers urea urethanes with improved rheological behavior, thixotropic agents comprising them, a process for their manufacture and their use as additives for coatings, lacquers and paints.

STATE OF THE ART

To control the rheology of liquid coating compounds, organically modified bentonites, silicic acids, hydrogenated castor oil and polyamide waxes are predominantly used. A disadvantage of these substances is that they are generally dry solids that have to be dispersed by means of solvents and shear forces to form semi-finished products or be introduced into the liquid coating compound by systematic temperature control. If these temperatures are not maintained, crystallites, which may result in defects in the coating, occur in the finished coating compound.

The general disadvantage of these rheological auxiliaries used at present is that they result in turbidities and clouds (haze) in clear, transparent coatings. In addition, handling dry, powdered products causing dusts during processing is undesirable.

Other achievements relating to rheology control were disclosed in European Patent Application EP 0198 519 B1 (AKZO). In the latter, an isocyanate is reacted with an amine in the presence of paint resin solutions to form a urea that forms needle-shaped crystals in very finely dispersed form. These paint binders modified in this way are offered as rheology-control agents and sag-preventing binders, as so-called "sag control agents".

The disadvantage of these products, however, is the result of the fact that they are always bound to the binder in which they have been prepared and do not permit any subsequent universal correction of finished coating agents.

European Patent EP 0006252 B1 (BYK CHEMIE) describes a process for preparing a thixotropic agent that eliminates some of the abovementioned disadvantages by describing urea urethanes that are prepared in aprotic solvents in the presence of LiCl by reacting isocyanate adducts with polyamines. The disadvantage of the products prepared in this way is the undefined structure of said urea urethanes due to the preparation process. Although isocyanate monoadducts are described, there are in fact no monoadducts at all in this case, as becomes clearly apparent from the Example, but mixtures of different adducts. In the process described, one mole of a diisocyanate is first reacted with one mole of a monoalcohol. This process partly produces the desired NCO-functional monoadducts, but also diadducts with no NCO-functionality. In addition, a proportion of the monomeric diisocyanate remains unreacted.

The proportions of these different compounds may vary, depending on the accessibility of the NCO group and the reaction conditions applied, such as temperature and time. The reason for the greatest disadvantage is, however, that all these adducts prepared in this way contain fairly large amounts of unreacted diisocyanate that, during the further reaction with polyamines in the presence of lithium chloride, results in uncontrolled chain extension of the urea urethane and in polymeric urea compounds. These products then have a tendency to precipitation and can be kept in solution only with the greatest difficulty.

A solution to this problem is provided by European patent EP 1048681 B1 (BYK CHEMIE) proposing to conduct the reaction explained above using molar excess of the diisocyanate compound of at least 1.5, preferably of about 2 to 3 and up to 5. The unreacted diisocyanate is separated off for example by vacuum distillation.

However, the products thus obtained show serious disadvantages with regard to their thixotropic flow, particularly at lower shear rates. There is also need for improving levelling and reducing spray patterns and the formation of an "orange peel" on the finished coatings.

Therefore, it has been the object of the present invention to provide urea urethanes with improved rheological behavior overcoming the disadvantages described above.

DESCRIPTION OF THE INVENTION

A first object of the present invention is directed to a urea urethane, obtainable or obtained according to a process encompassing or consisting of the following steps:

(a) providing a monohydroxyl compound of formula (I) R—OH (I) in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x$— or $C_mH_{2m+1}(OOC-C_vH_{2v})_x$—, and m stands for an integer of from 1 to 22, n stands for an integer of 2 to 4, x for an integer of 1 to 15 and v means 4 or 5;

(b) providing a diisocyanate compound of formula (II)

$$\text{OCN-[A]-NCO} \quad (II)$$

In which A stands for a linear or branched alkylene radical having 2 to 10 carbon atoms or a toluylene radical;

(c) reacting said monohydroxyl compound and said diisocyanate compound to form a pre-polymer;

(d) reacting said pre-polymer with a diamine compound, said diamine compound being selected from the group consisting of (d1) compound (III)

$$H_2N\text{-[B]-}NH_2 \quad (III)$$

where B stands for a linear or branched alkylene group having 2 to 12 carbon atoms; and/or (d2) compound (IV)

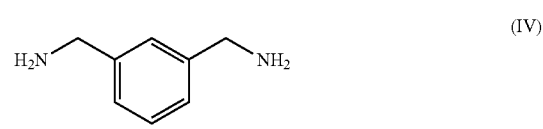

(IV)

and/or (d3) compound (V)

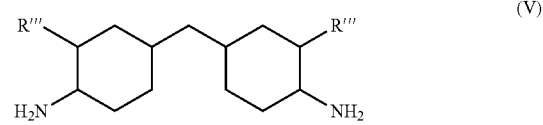

(V)

in which R''' stands for hydrogen or a methyl group, in the presence of a lithium salt, wherein
said monohydroxyl compound and said diisocyanate compound are reacted in a molar ratio of 1:1.1 to 1:1.45.

Surprisingly, it has been observed that reducing the excess of the diisocyanate compound improves the flow behavior of the compounds, particularly at lower shear rates improves levelling, and reduces spray patterns and the formation of an "orange peel" on the finished coatings. This is even more unexpected since the prior art teaches literally the opposite, that is using the diisocyanate compounds in high excesses. Another advantage of the present invention is that it requires fewer raw materials and saves energy, since it does not require removing large amounts of isocyanate. Therefore, the overall manufacturing process is significantly cheaper.

BRIEF DESCRIPTION OF THE DRAWINGS

The present invention will be described in greater detail with reference to the accompanying drawings in which.

THIXOTROPIC AGENTS

Figure 1:
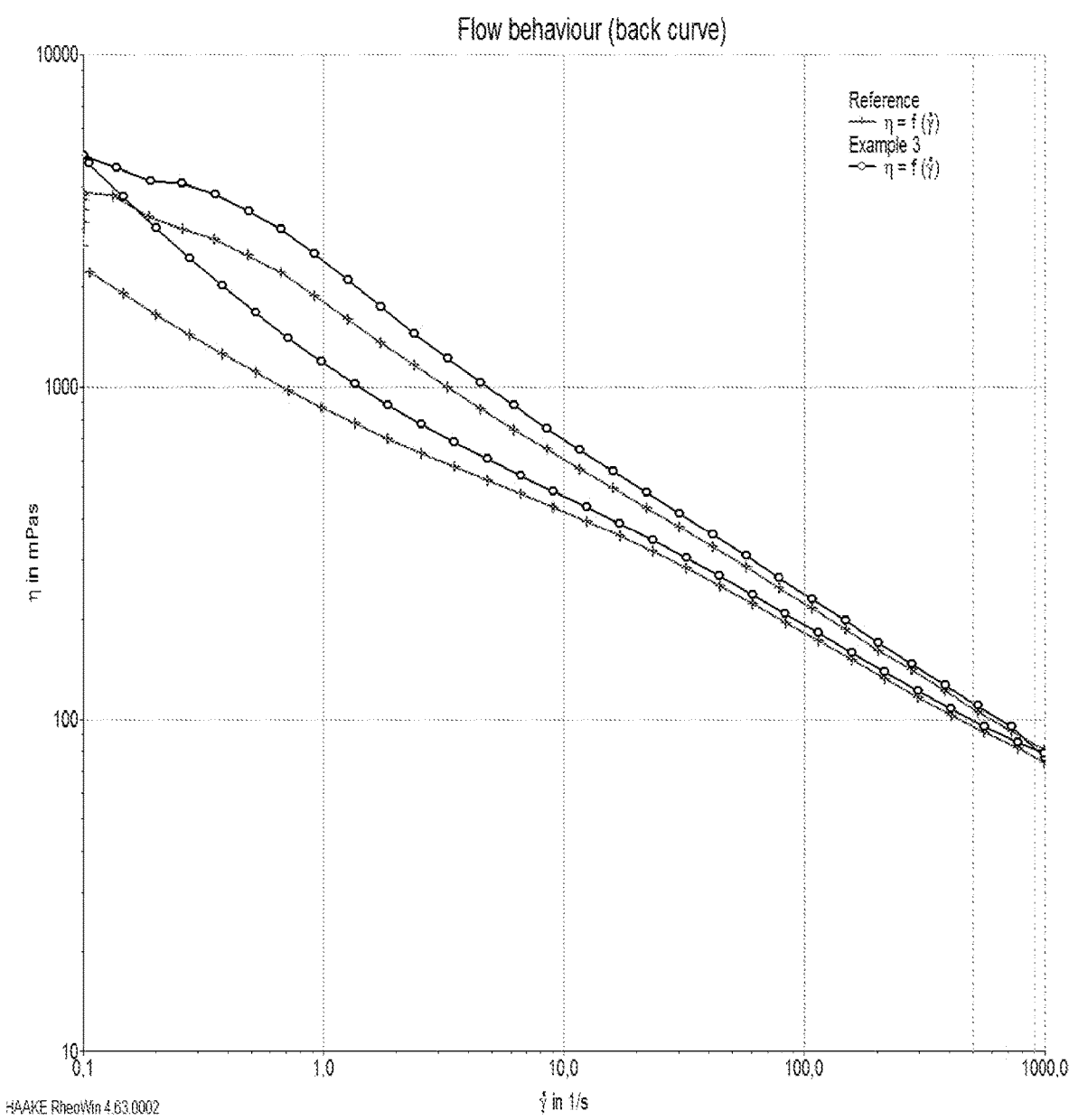
FIG. 1 illustrates a comparison of flow curves in a standard paint for an embodiment of the present invention with a reference urea urethane.

Another object of the present invention is directed to a thixotropic agent comprising the new urea urethane as described above and a solvent. The preferred solvents are aprotic and encompass for example dimethyl formamide, dimethyl acetamide, N-methyl pyrrolidone or N-butyl pyrrolidone or similar alkyl pyrrolidones. Typically, the solvent is present in an amount of from about 20 to about 95% by weight, preferably about 40 to about 80% by weight and more preferably about 50 to about 60% b.w.

Manufacturing Process

Another object of the present invention refers to a process for obtaining a urea urethane, encompassing or consisting of the following steps:
(a) providing a monohydroxyl compound of formula (I)R—OH (I)in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x-$ or $C_mH_{2m+1}(OOC-C_vH_{2v})_x-$, and m stands for an integer of from 1 to 22, n stands for an integer of 2 to 4, x for an integer of 1 to 15 and v means 4 or 5;
(b) providing a diisocyanate compound of formula (II)

OCN-[A]-NCO (II)

In which A stands for a linear or branched alkylene radical having 2 to 10 carbon atoms or a toluylene radical;
(c) reacting said monohydroxyl compound and said diisocyanate compound to form a pre-polymer;
(d) reacting said pre-polymer with a diamine compound, said diamine compound being selected from the group consisting of
(d1) compound (III)

$H_2N$-[B]-$NH_2$ (III)

where B stands for a linear or branched alkylene group having 2 to 12 carbon atoms; and/or
(d2) compound (IV)

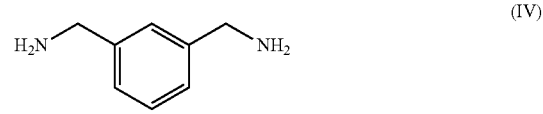

(IV)

and/or
(d3) compound (V)

R'''⟨cyclohexyl⟩-CH2-⟨cyclohexyl⟩R''' with H2N and NH2 (V)

in which R''' stands for hydrogen or a methyl group, in the presence of a lithium salt,
wherein
said monohydroxyl compound and said diisocyanate compound are reacted in a molar ratio of 1:1.1 to 1:1.45.

Monohydroxyl Compounds

Suitable monohydroxyl compounds encompass linear or branched, aliphatic or aromatic alcohols having 4 to 22 and preferably 6 to 12 carbon atoms and their alkylene oxide adducts, preferably adducts of on average 1 to 20, and preferably 2 to 10 mol ethylene oxide, propylene oxide or their mixtures to one of the aforementioned alcohols. Particularly preferred are butanol (all isomers), pentanol, hexanol, heptanol, octanol, nonanol, decanol, undecanol, dodecanol, myristyl alcohol, stearyl alcohol, cetyl alcohol, oleyl alcohol, erucyl alcohol, behenyl alcohol, phenol, benzyl alcohol and their technical mixtures and adducts of 1 to 20 mol, preferably 2 to 10 mol ethylene oxide and/or 1 to 5, preferably 2 to 4 mol propylene oxide.

Particularly preferred, however, are alkyl polyalkylene glycol ethers, preferably alkyl polyethylene glycol ethers having a molecular weight of from about 200 to about 1,000 Dalton, as for example methyl ethers (MPEG) or butyl ethers (BPEG) of PEG100, PEG200, PEG300, PEG350 or PEG500.

Diisocyanate Compounds

While the diisocyanate compound can be of aliphatic origin, the preferred embodiments encompass aromatic or cycloaliphatic compounds. Particularly preferred is toluylene diisocyanate which as available for example under the trademark Desmodur® in the market. With regard to the performance of the end product a toluylene diisocyanate encompassing about 50 to about 80 mol-% of the 2,4-isomer is particularly preferred.

Diamine Compound

Suitable diamine compounds encompass aliphatic, cycloaliphatic and aromatic diamines. The preferred species, however, is xylene diamine.

In a particular preferred embodiment the urea urethanes of the present invention are obtained by reacting MPEG300, MPEG350, BPEG300 or BPEG350 with toluylene diisocyanate in a molar ration of from 1:1.2 to 1:1.4 to form a pre-polymer, which is subsequently

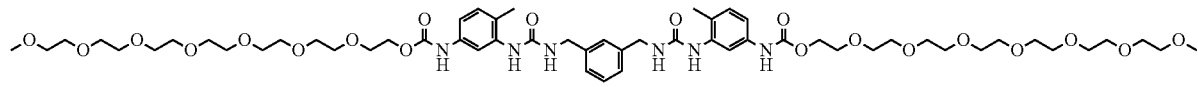

reacted with xylene diamine to form the final product and is illustrated by the following formula:

Reaction Step 1: Formation of the Pre-Polymer

Key to the present invention is the formation of the pre-polymer, according to which said monohydroxyl compounds and said diisocyanate compounds are reacted in a molar ratio preferably of from 1:1.2 to 1:1.4. Depending on the excess of diisocyanate pre-polymers containing one or two polyether groups are obtained. A disubstituted pre-polymer does not offer a free reaction side for condensation with the amine group, remains as such in the final composition. Applicant, however, has recognized that the dissatisfying performance of the similar products from the market is linked to the amount of unreacted pre-polymers. By reducing the excess of diisocyanate the amount of pre-polymers available for further condensation with the diamine compound—as desired—is significantly increased. This does not only lead to products of improved performance, but also to a composition which is different from the market products and thus novel over the prior art.

Once the pre-polymer is formed it is advantageous removing the unreacted diisocyanate for example by distillation in vacuum. Preferably the remaining pre-polymers show a content of unreacted diisocyanate of less than 0.5% by weight, and preferably about 0.1 to 0.2% by weight.

The specific reaction conditions are illustrated by—but not limited to—the working examples.

Reaction Step 2: Formation of the Urea Urethane

Subsequently the pre-polymer thus obtained is reacted with a diamine compound, preferably in an aprotic solvent such as dimethyl formamide, dimethyl acetamide, N-methyl pyrrolidone or N-butyl pyrrolidone or similar alkyl pyrrolidones. Typically, the diamine compound—and optionally also the lithium salt—are dissolved in the solvent and placed into the reactor to which the pre-polymer is added.

The molar ratio between pre-polymer and diamine compound is adjusted to about 1:1.2 to 1.2:1.

Lithium chloride or lithium nitrate, but preferably LiCl, may be used as lithium salts. The amount of lithium compounds is 0.2-2 mol, preferably 0.5-1.5 mol, particularly preferably 0.75-1.25 mol of lithium, relative to the amine equivalent of the diamine used. The use of lithium nitrate in contrast to lithium chloride can be advantageous since chloride ions may have a disadvantageous effect on coating compounds and promote the corrosion of the metallic bases to which the thixotropic coating compounds are applied.

The solids amount can adjusted in broad ranges of from about 5 to about 80% by weight, preferably about 20 to about 60% by weight, and more preferred about 40 to about 50% by weight. The amount to 100% is the solvent, optionally comprising small amounts of suitable additives as for example corrosion inhibitors.

The urea urethanes prepared according to the present invention do not contain either free isocyanate groups or free amino groups. They are accordingly physiologically safe. Furthermore, no adverse side reactions occur with binders or fillers. The storage stability of these urea urethane solutions prepared in this way is extraordinarily high and is certainly 6 months or more at, normal storage temperature

INDUSTRIAL APPLICATION

Another object of the present invention refers to a method for adjusting the rheological properties of a paint, a lacquer or a coating composition encompassing the following steps:
(i) providing a non-solid paint, lacquer or coating composition; and
(ii) adding a working amount of the urea urethane, the agent or the product obtained according to the process—all as described above.

Finally, the present invention also encompasses the use of the urea urethane, the agent or the product obtained according to the process—all as described above—as a rheology modifier, particularly for non-solid paints, lacquers and coating compositions.

EXAMPLES

Preparation Examples

Example 1

Synthesis of Mono Isocyanate with Polyethylene Glycol Monomethyl Ether

A reactor is loaded with 208.8 gram of Desmodur® T80 (Toluene diisocyanate, 80% 2.4-isomer, 1.2 mol) and placed under a nitrogen blanket at 25° C. 350 gram of polyethylene glycol monomethyl ether (mw: 350 g/mol) is added dropwise to the mixture while stirring. The temperature did not exceed above 35° C. After completing the addition the reaction was followed on NCO content and stopped when the NCO content is in the correct range. The excess of TDI will be evaporated by vacuum and higher temperature. A slightly brown product was observed. The final NCO content is approximate 7.01% and the product has a viscosity of approximately 450 mPas. The final free TDI content is below 0.1%

Example 2

Synthesis of Mono Isocyanate with Polyethylene Glycol Monobutyl Ether

A reactor is loaded with 208.8 gram of Desmodur® T80 (Toluene diisocyanate, 80% 2.4-isomer, 1.2 mol) and placed under a nitrogen blanket at 25° C. 382 gram of polyethylene glycol monobutylether (mw: 382 g/mol) is added dropwise to the mixture while stirring. The temperature did not exceed above 35° C. After completing the addition the reaction was followed on NCO content and stopped when the NCO content is in the correct range. The excess of TDI will be evaporated by vacuum and higher temperature. A slightly brown product was observed. The final NCO content is approximate 7.01% and the product has a viscosity of approximately 450 mPas. The final free TDI content is below 0.1%

Example 3

Synthesis of Polyurea Based on Monoisocyatate from Example 1

The reactor was loaded with 6.0 gram LiCl (1.2 wt %), 220.5 gram n-Butyl pyrrolidone (so called NBP) and 20.6 gram m-xylene diamine (4.12 wt %, based on NCO content) and the mixture is while stirring heated up to 100° C. All LiCl should be dissolved before addition of the monoadduct starts. A homogeneous mixture of 179.4 gram monoadduct from example 1 and 73.50 gram NBP is added in approximate 1 hour. The NCO peak should be disappeared (follow by IR). The reaction mixture is stirred for at least 30 minutes. The reaction mixture is cooled down to room temperature when no NCO was found in IR. A clear low viscous product is observed.

Example 4

Synthesis of Polyurea Based on Monoisocyatate from Example 2

The reactor was loaded with 6.0 gram LiCl (1.2 wt %), 220.5 gram n-Butyl pyrrolidone (so called NBP) and 20.6 gram m-xylene diamine (4.12 wt %, based on NCO content) and the mixture is while stirring heated up to 100° C. All LiCl should be dissolved before addition of the monoadduct starts. A homogeneous mixture of 179.4 gram monoadduct from example 1 and 73.50 gram NBP is added in approximate 1 hour. The NCO peak should be disappeared (follow by IR). The reaction mixture is stirred for at least 30 minutes. The reaction mixture is cooled down to room temperature when no NCO was found in IR. A clear low viscous product is observed.

Application Tests

Example 5, Comparative Example C1

0.75 g of the urea urethane according to Example 3 and 0.75 g of a reference urea urethane[1] respectively were given 10 g of standard metal protection lacquer from the market. The rheological properties of the resulting compositions are compiled in Table 1:

[1] The reference was prepared according to Example 3, however using a molar ratio of MPEG300 and Desmodur T80 of 1:3 as proposed in Example 8 of EP 1048681 B1 (BYK CHEMIE)

TABLE 1

| Rheological properties | | |
| --- | --- | --- |
| Parameters | Example 5 | Example C1 |
| Urea urethane | according Example 3 | Reference |
| Krebs stormer units | 63 | 65 |
| High shear viscosity in paints ICI [Poise] | 0.6 | 0.6 |
| Viscosity (Brookfield sp4 @ 5 rpm) [mPas] | 1560 | 2000 |
| Viscosity (Brookfield sp4 @ 50 rpm) [mPas] | 552 | 392 |
| Sag resistance (50-475 μm) | 125 | 150 |

TABLE 1-continued

| Rheological properties | | |
| --- | --- | --- |
| Parameters | Example 5 | Example C1 |
| Levelling (levelling blade 419) | 6 | 5 |
| Gloss units at 85° | 24 | 24 |

Figure 2:
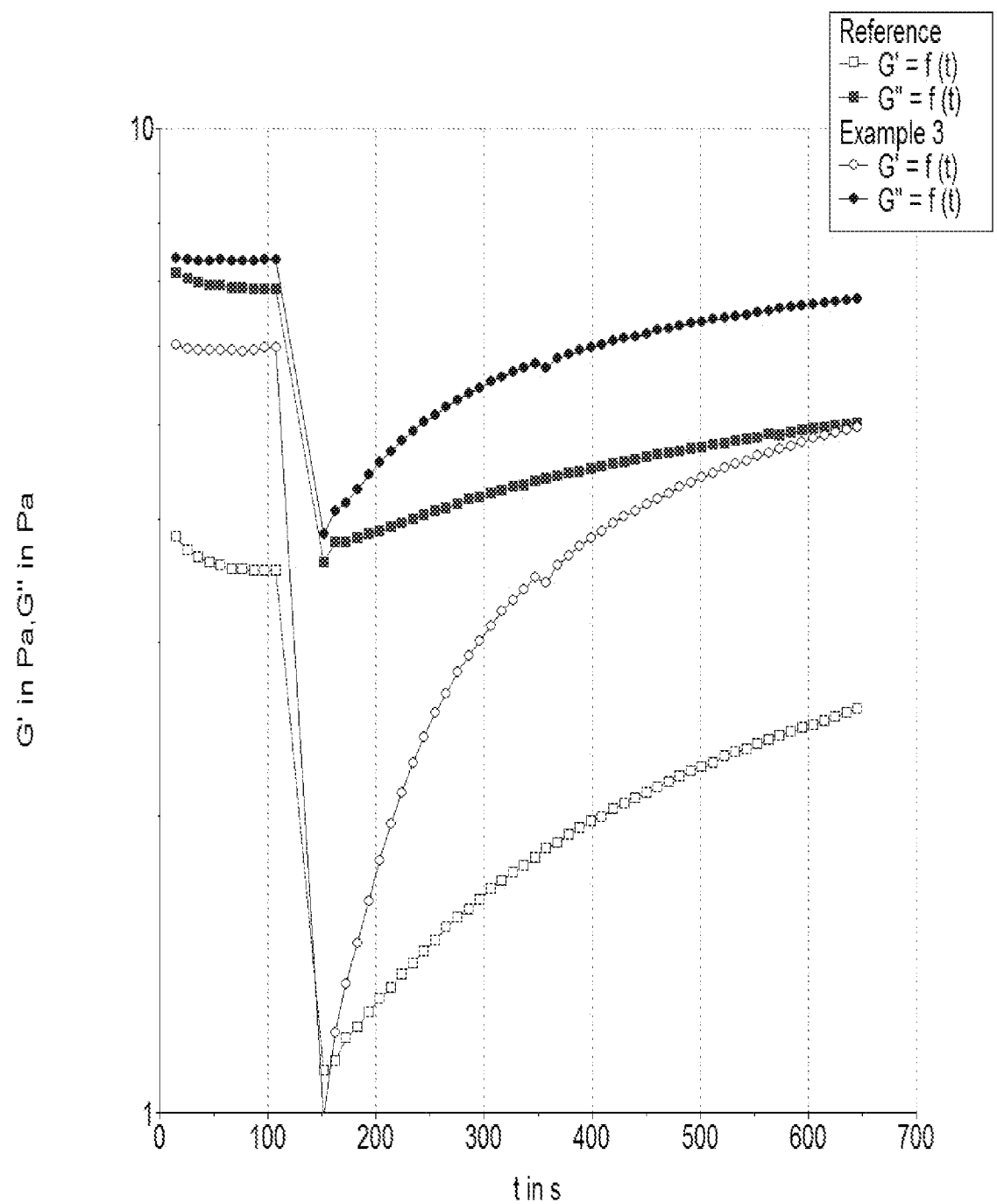
FIGS. 2 and 3 illustrate a comparison of recoveries in the paints compared in FIG. 1.
Figure 3:
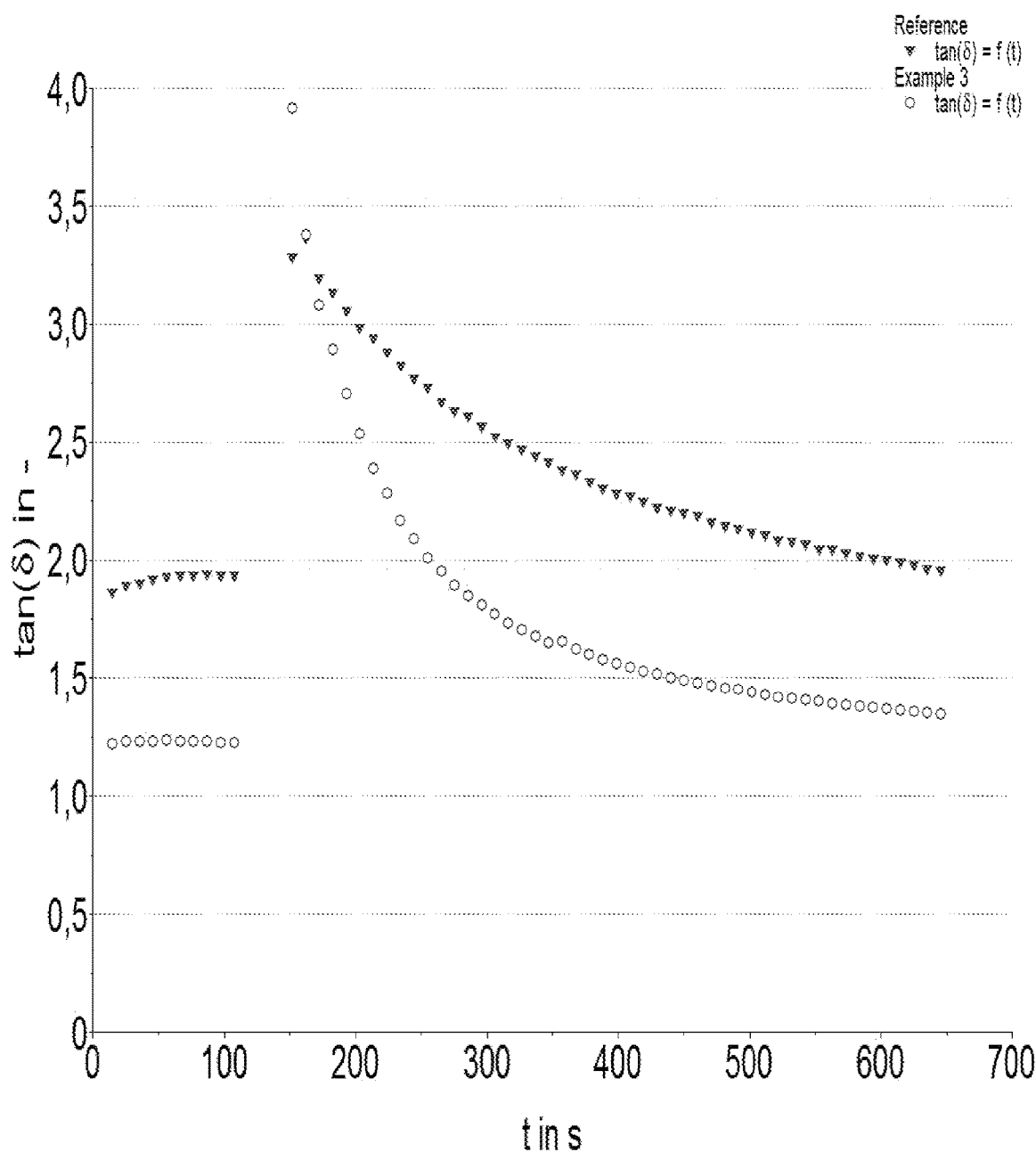

The corresponding flow curves in a standard paint (FIG. 1) and the recoveries in paint (FIGS. 2 and 3) for both products are depicted separately.

The upper curves refer to the product according to the present invention.

Example 6, Comparative Example C2

Figure 4:
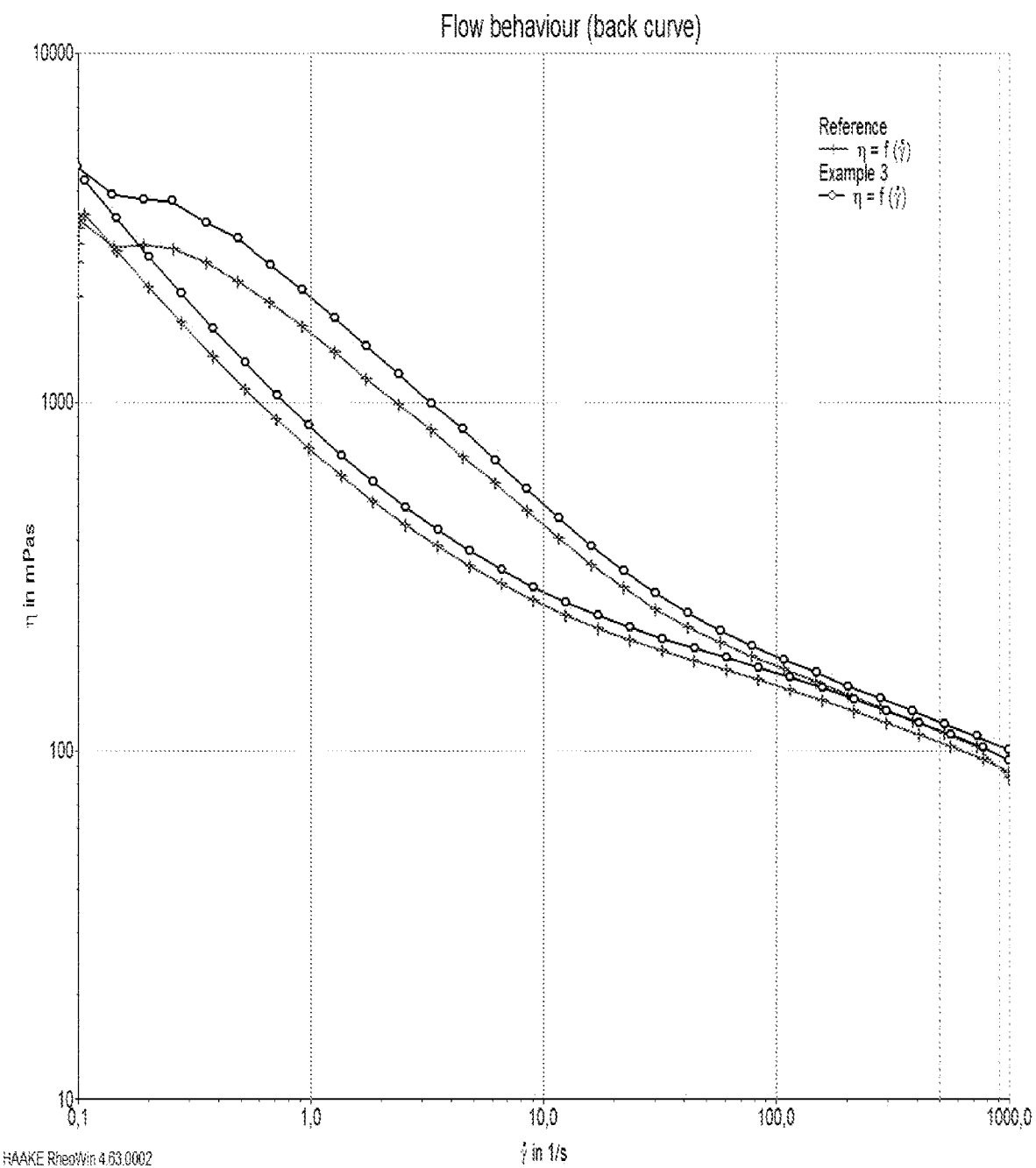
FIG. 4 illustrates a comparison of flow behavior in another embodiment of the present invention with a reference and control.
Figure 5:
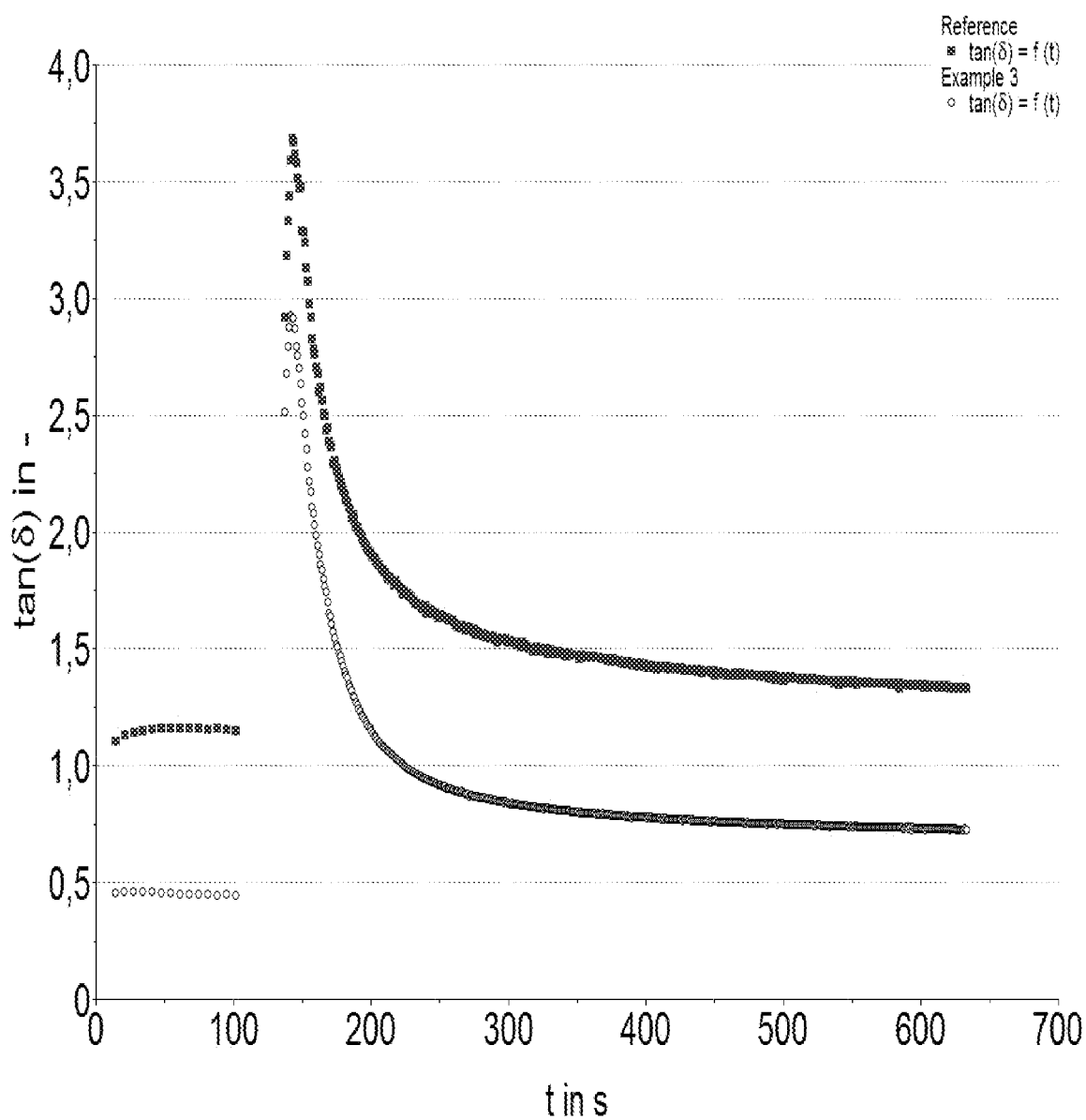
FIG. 5 illustrates recovery of the reference and control compared in FIG. 4.

100 g of a standard polyurethane alkyd emulsion was treated with 0.75 g of the urea urethane of Example 3 and 0.75 g of the reference product respectively. Rheological properties of the compositions are compiled in Table 2; the respective flow curve is shown in FIG. 4, the recovery in FIG. 5.

TABLE 2

| Rheological properties | | | |
| --- | --- | --- | --- |
| Parameters | Control | Example 6 | Example C2 |
| Urea urethane | none | according Example 3 | Reference |
| High shear viscosity in paints ICI [Poise] | 0.5 | 0.7 | 0.6 |
| Viscosity (Brookfield sp4 @ 5 rpm) [mPas] | | 1600 | 1620 |
| Viscosity (Brookfield sp4 @ 50 rpm) [mPas] | | 600 | 612 |
| Sag resistance (50-475 μm) | <50 | 75 | 100 |
| Levelling (levelling blade 419) | 10 | 8 | 8 |
| Gloss units at 85° | 82 | 75 | 74 |

The inventive examples clearly demonstrate that the new urea urethanes according to the present invention provide similar performance to the reference, i.e. thixotropic flow and improving levelling of the finished coatings.

Figure 6:
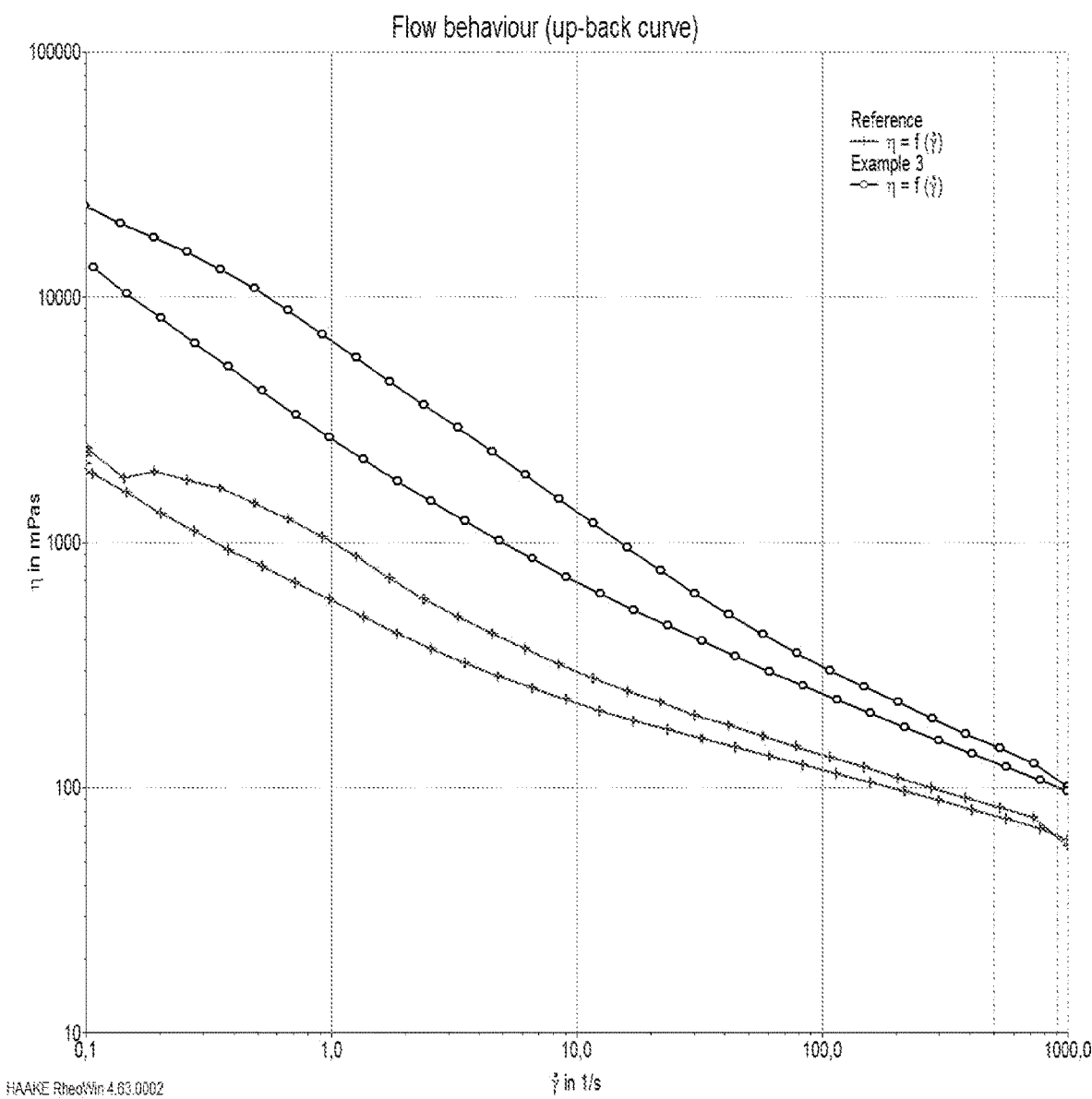
FIG. 6 illustrates a comparison of flow behavior in a particular PVC dispersion including a further embodiment of the present invention with the reference urea urethane.

Evaluation in other paint systems based on different binders showed a surprisingly better performance and higher efficiency with the present invention. This is demonstrated in the following FIGS. 6 to 9:

FIG. 6: Flow behavior (up and back curve) for a composition of 100 g of a 19% PVC dispersion (acrylic mixture) plus 1.5% of the urea urethane of Example 3 and the reference respectively.

Figure 7:
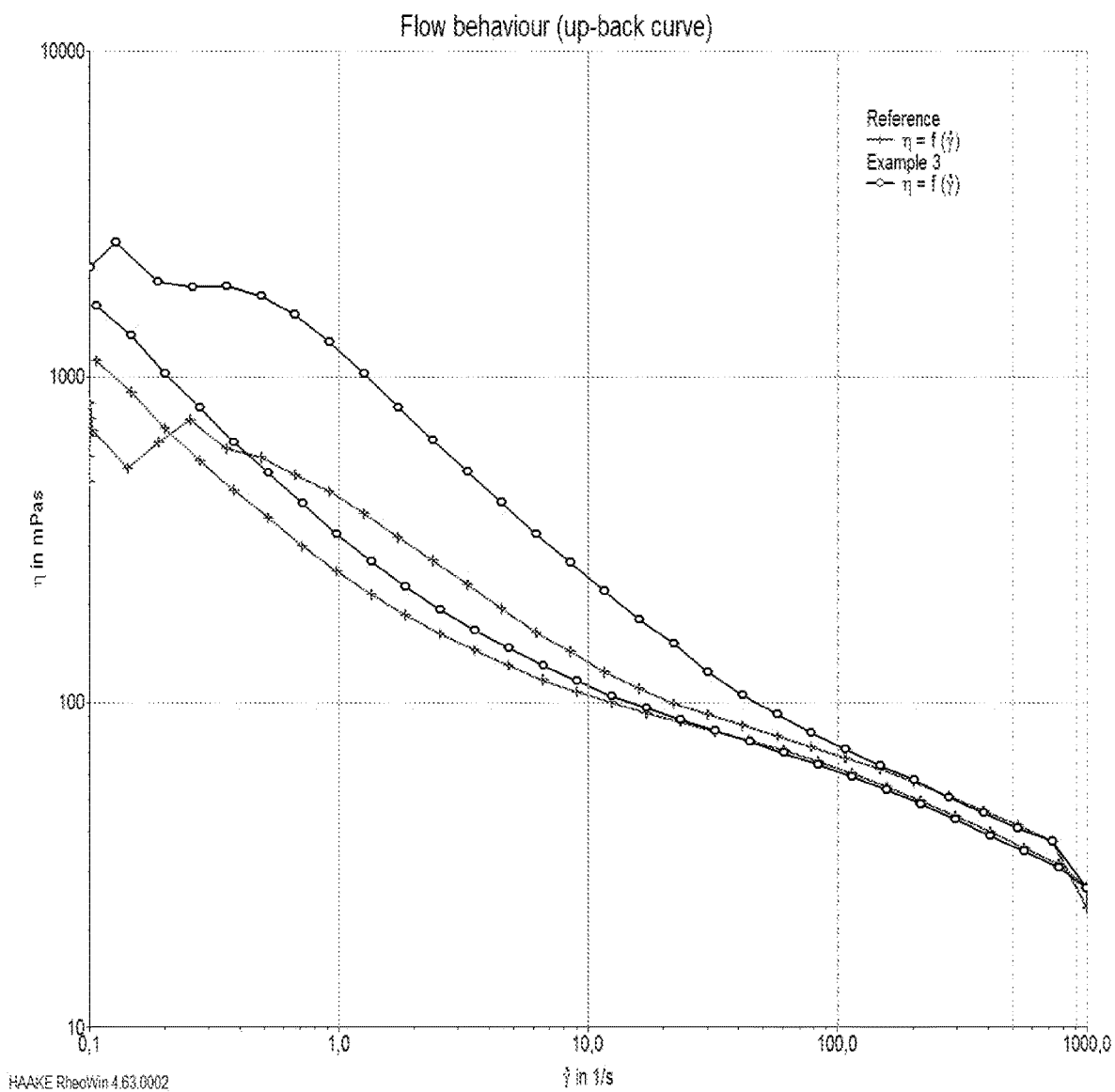
FIG. 7 illustrates a comparison of flow behavior in a clear coating including the urea urethane of the present invention compared in FIG. 6.

FIG. 7: Flow behavior (up and back curve) for a composition of 100 g of a clear coating (acrylic mixture) plus 1.5% of the urea urethane of Example 3 and the reference respectively.

Figure 8:
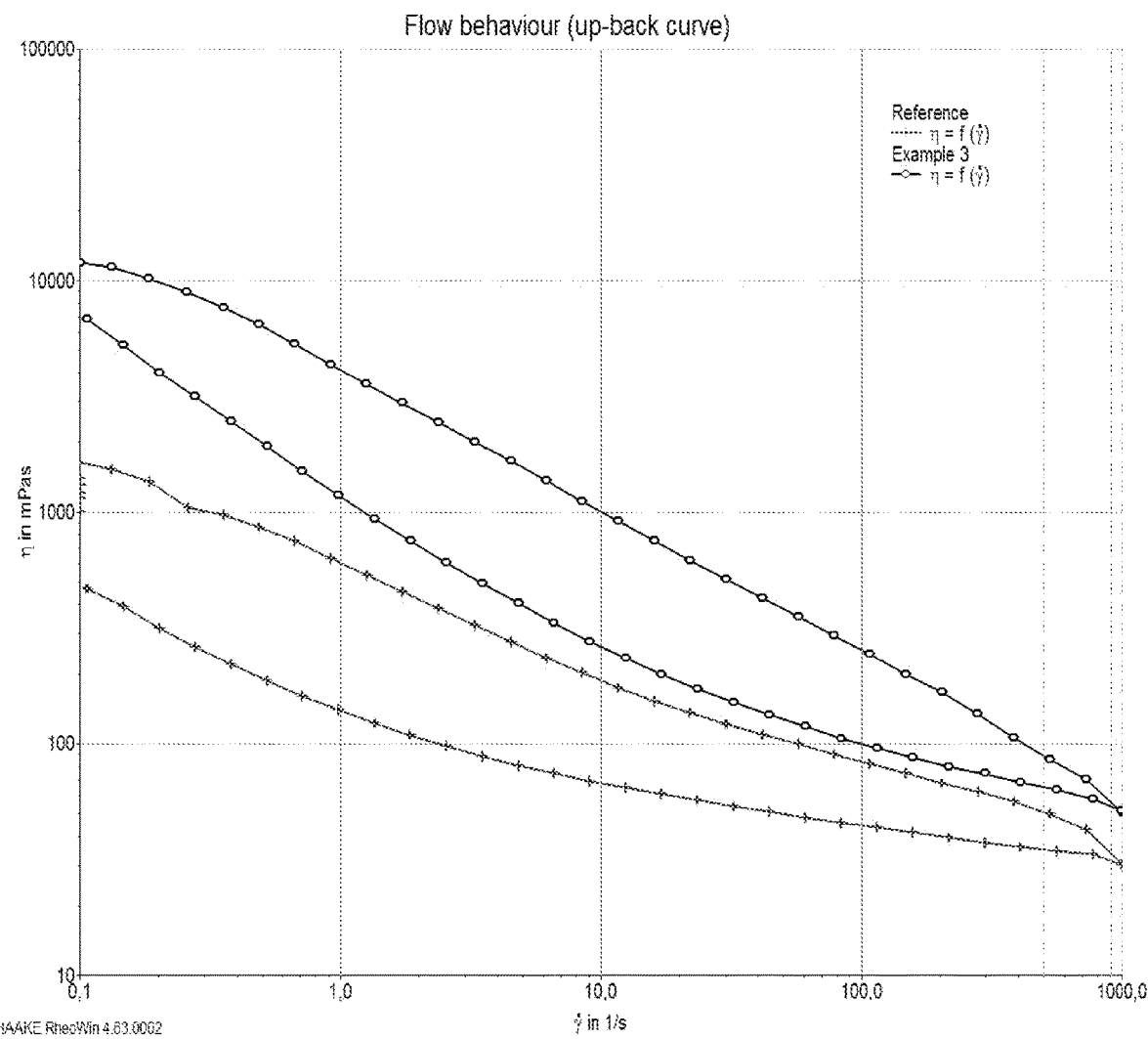
FIG. 8 illustrates a comparison of flow behavior in the PVC dispersion of FIG. 6 and having a different amount of the embodiment of urea urethane of the present invention.

FIG. 8: Flow behavior (up and back curve) for a composition of 100 g of a 19% PVC dispersion (pure acrylic) plus 1% of the urea urethane of Example 3 and the reference respectively.

Figure 9:
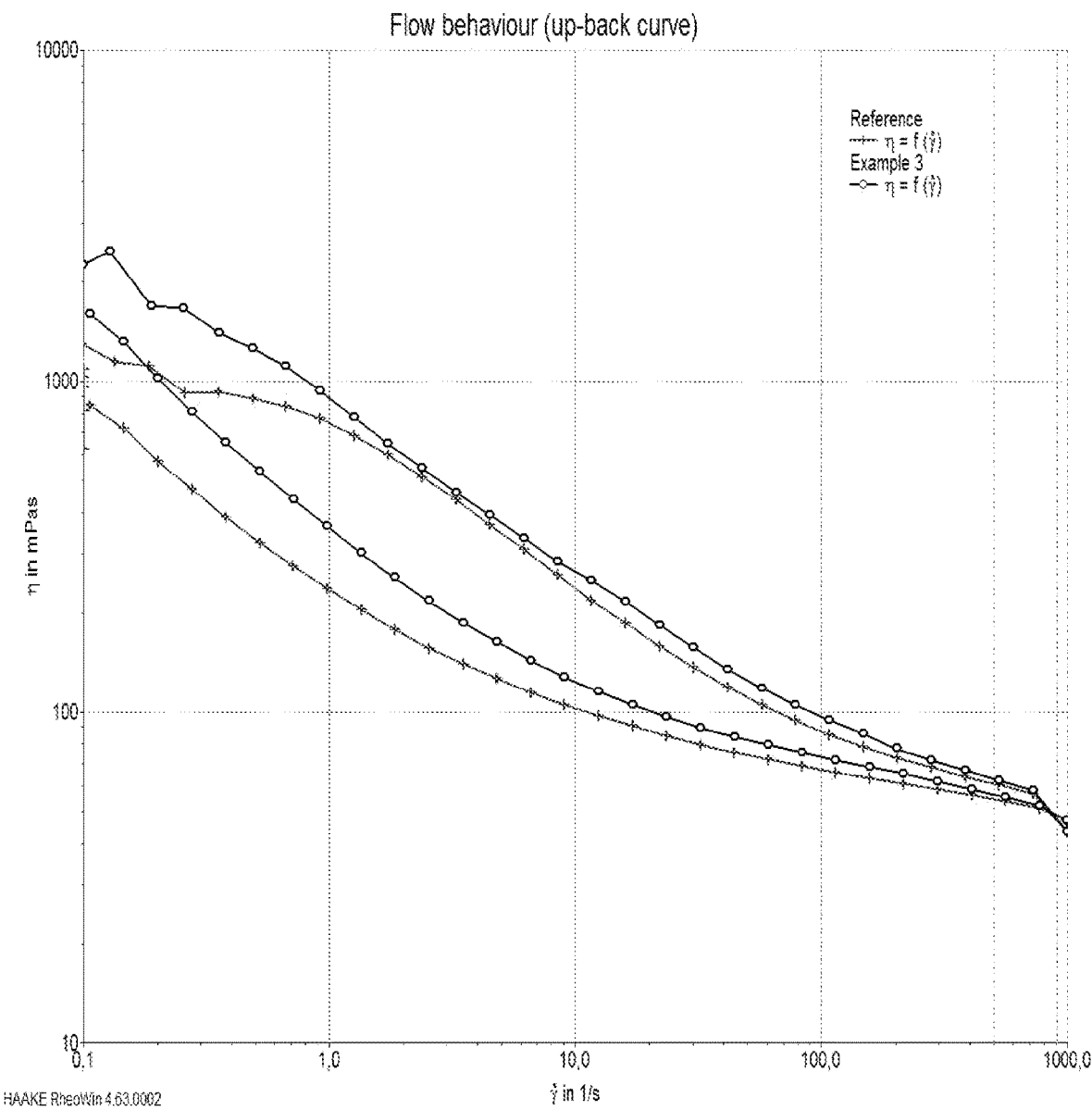
FIG. 9 illustrates a comparison of flow behavior in the clear coating of FIG. 7 and having a different amount the embodiment of the urea urethane of the present invention.

FIG. 9: Flow behavior (up and back curve) for a composition of 100 g of a clear coating (pure acrylic) plus 1.5% of the urea urethane of Example 3 and the reference respectively.

The upper up and back curves belong to the example according to the present invention.

The invention claimed is:
1. A urea urethane, obtained according to a process comprising the following steps:
(a) providing a monohydroxyl compound of formula (I)

in which R is n-alkyl or isoalkyl containing 4 to 22 carbon atoms, cycloalkyl containing 6 to 12 carbon atoms, aralkyl containing 7 to 12 carbon atoms or a radical of the formula CmH2m+1(O-CnH2n)x- or CmH2m+1(OOC-CvH2v)x-, and m stands for an integer of from 1 to 22, n stands for an integer of 2 to 4, x for an integer of 1 to 15 and v means 4 or 5;
(b) providing a diisocyanate compound of formula (II)

in which A stands for a linear or branched alkylene radical having 2 to 10 carbon atoms or a toluylene radical;
(c) reacting said monohydroxyl compound and said diisocyanate compound to form a pre-polymer;
(d) reacting said pre-polymer with a diamine compound, said diamine compound being selected from the group consisting of
(d1) compound (III)

where B stands for a linear or branched alkylene group having 2 to 12 carbon atoms,
(d2) compound (IV)

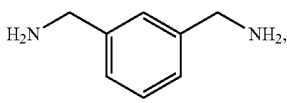

and
(d3) compound (V)

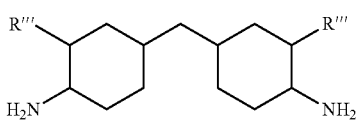

in which R''' stands for hydrogen or a methyl group and mixtures thereof, in the presence of a lithium salt, wherein
said monohydroxyl compound and said diisocyanate compound are reacted in a molar ratio of 1:1.1 to 1:1.4.
2. A thixotropic agent comprising the urea urethane of claim 1 and a solvent.
3. The agent of claim 2, wherein the solvent is present in an amount of from about 20 to about 95% by weight.
4. A process for obtaining an urea urethane, comprising the following steps:
(a) providing a monohydroxyl compound of formula (I)

in which R is n-alkyl or isoalkyl containing 4 to 22 carbon atoms, cycloalkyl containing 6 to 12 carbon atoms, aralkyl containing 7 to 12 carbon atoms or a radical of the formula CmH2m+1(O-CnH2n)x- or CmH2m+1(OOC-CvH2v)x-, and m stands for an integer of from 1 to 22, n stands for an integer of 2 to 4, x for an integer of 1 to 15 and v means 4 or 5;
(b) providing a diisocyanate compound of formula (II)

in which A stands for a linear or branched alkylene radical having 2 to 10 carbon atoms or a toluylene radical;
(c) reacting said monohydroxyl compound and said diisocyanate compound to form a pre-polymer;
(d) reacting said pre-polymer with a diamine compound, said diamine compound being selected from the group consisting of
(d1) compound (III)

where B stands for a linear or branched alkylene group having 2 to 12 carbon atoms,
(d2) compound (IV)

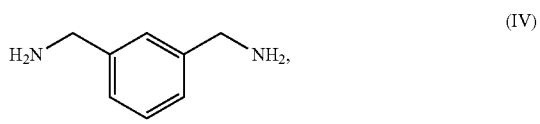

and
(d3) compound (V)

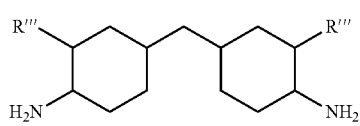

in which R''' stands for hydrogen or a methyl group and mixtures thereof, in the presence of a lithium salt, wherein
said monohydroxyl compound and said diisocyanate compound are reacted in a molar ratio of 1:1.1 to 1:1.4.
5. The process of claim 4, wherein said diisocyanate compound is toluylene diisocyanate.
6. The process of claim 5, wherein said toluylene diisocyanate encompasses about 50 to about 80 mol-% of the 2,4-isomer.
7. The process of claim 4, wherein said monohydroxyl compound and said diisocyanate compound are reacted in a molar ratio of from 1:1.2 to 1:1.4.
8. The process of claim 4, wherein prior to the reaction with the diamine compound, unreacted diisocyanate is removed from the pre-polymer.
9. The process of claim 8, wherein the pre-polymer subsequently shows a content of unreacted diisocyanate of less than 0.5% by weight.
10. The process of claim 4, wherein the diamine compound is xylene diamine.
11. The process of claim 4, wherein said lithium salt is lithium chloride or lithium nitrate.
12. The process of claim 4, wherein said pre-polymer and said diamine compound are reacted in an aprotic solvent.
13. A method for adjusting the rheological properties of a paint, a lacquer or a coating composition comprising the following steps:
(i) providing a non-solid paint, lacquer or coating composition; and (ii) adding a working amount of the urea urethane of claim 1.

14. A method for adjusting the rheological properties of a paint, a lacquer or a coating composition comprising the following steps:
  (i) providing a non-solid paint, lacquer or coating composition; and
  (ii) adding a working amount of the agent of claim 2.

15. The urea urethanes of claim 1, wherein said monohydroxyl compound and said diisocayante compound are reacted in a molar ratio of 1:1.1 to 1:1.2.

16. The urea urethanes of claim 4, wherein said monohydroxyl compound and said diisocayante compound are reacted in a molar ratio of 1:1.1 to 1:1.2.

\* \* \* \* \*